United States Patent
Mola et al.

(10) Patent No.: US 6,555,042 B1
(45) Date of Patent: Apr. 29, 2003

(54) METHOD OF MAKING A VEHICLE HEADLINER ASSEMBLY WITH INTEGRAL SPEAKERS

(75) Inventors: John F. Mola, Lathrup Village, MI (US); George Byma, Clarkston, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/121,788

(22) Filed: Jul. 24, 1998

(51) Int. Cl.[7] .................... B29C 43/18; B29C 43/20; B29C 43/52

(52) U.S. Cl. .............. 264/258; 264/271.1; 264/272.11; 264/319; 156/322

(58) Field of Search ................ 264/271.1, 272.11, 264/272.15, 272.17, 319, 275, 278, 257, 258; 181/141, 145, 150; 156/297, 298, 299, 322

(56) References Cited

U.S. PATENT DOCUMENTS

| | | | |
|---|---|---|---|
| 1,930,577 A | | 10/1933 | Atkinson |
| 2,060,666 A | | 11/1936 | Ellmore |
| 2,069,328 A | | 2/1937 | Rockwell |
| 3,158,835 A | | 11/1964 | Hipkins |
| 4,005,761 A | | 2/1977 | Okamoto et al. |
| 4,056,165 A | | 11/1977 | Okamoto et al. |
| 4,119,794 A | * | 10/1978 | Matsuki ................ 174/48 |
| 4,132,859 A | | 1/1979 | Ranga |
| 4,256,797 A | | 3/1981 | Stamper et al. |
| 4,329,544 A | | 5/1982 | Yamada |
| 4,330,584 A | * | 5/1982 | Doerer ................ 296/214 |
| 4,358,883 A | | 11/1982 | Gerring |
| 4,363,848 A | * | 12/1982 | Le Duc et al. ........... 296/214 |
| 4,385,955 A | * | 5/1983 | Doerfling et al. ........ 156/245 |
| 4,594,729 A | | 6/1986 | Weingartner |
| 4,673,056 A | * | 6/1987 | Koppelomaki ........... 181/141 |

(List continued on next page.)

FOREIGN PATENT DOCUMENTS

| | | |
|---|---|---|
| DE | 36 03 198 A1 | 10/1986 |
| DE | 44 31 873 A1 | 3/1995 |
| EP | 0 411 786 A1 | 2/1991 |
| GB | 1 555 409 | 7/1979 |
| GB | 2 134 464 A | 8/1984 |
| IT | 671885 | 10/1964 |
| JP | 4 97699 | 3/1992 |
| JP | 4-97700 | 3/1992 |
| JP | 4-114600 | 4/1992 |
| WO | WO 98/13942 | 4/1998 |
| WO | WO 98/16409 | 4/1998 |
| WO | WO 98/42536 | 10/1998 |

OTHER PUBLICATIONS

International Search Report, Nov. 11, 1999.

*Primary Examiner*—Angela Ortiz
(74) *Attorney, Agent, or Firm*—Bill C. Panagos

(57) ABSTRACT

A vehicle headliner assembly includes a headliner attachable to the vehicle interior roof. The headliner includes a plurality of material layers. At least one audio speaker is sandwiched between the material layers. The speaker has a thickness of less than approximately 8 millimeters. A subwoofer may be provided elsewhere in the vehicle to complete the audio system.

16 Claims, 1 Drawing Sheet

U.S. PATENT DOCUMENTS

| | | | |
|---|---|---|---|
| 4,703,502 A | | 10/1987 | Kasai et al. |
| 4,828,910 A | | 5/1989 | Haussling |
| 4,924,962 A | | 5/1990 | Terai et al. |
| 4,953,213 A | | 8/1990 | Tasaki et al. |
| 4,953,219 A | | 8/1990 | Kasai et al. |
| 4,968,154 A | | 11/1990 | Baeg |
| 4,972,489 A | | 11/1990 | Oki et al. |
| 5,007,976 A | * | 4/1991 | Satterfield et al. .......... 156/222 |
| 5,016,934 A | * | 5/1991 | Pelz ........................... 296/214 |
| 5,068,001 A | * | 11/1991 | Haussling ................... 156/222 |
| 5,129,004 A | | 7/1992 | Imai et al. |
| 5,155,770 A | | 10/1992 | Maejima |
| 5,172,415 A | | 12/1992 | Fosgate |
| 5,280,991 A | | 1/1994 | Weiland |
| 5,481,618 A | | 1/1996 | Ross et al. |
| 5,503,903 A | * | 4/1996 | Bainbridge et al. ......... 156/242 |
| 5,586,385 A | * | 12/1996 | Nishino et al. ............. 156/245 |
| 5,591,289 A | * | 1/1997 | Souders et al. ............. 156/148 |
| 5,754,664 A | | 5/1998 | Clark et al. |
| 5,754,674 A | | 5/1998 | Clark et al. |
| 5,841,081 A | * | 11/1998 | Thompson et al. ......... 181/286 |
| 5,939,682 A | * | 8/1999 | Hartmann ................... 181/141 |
| 5,976,295 A | * | 11/1999 | Ang ........................... 156/209 |
| 6,008,149 A | * | 12/1999 | Copperwheat .............. 442/381 |
| 6,206,999 B1 | * | 3/2001 | Ritto et al. ................. 156/245 |
| 6,375,778 B1 | * | 4/2002 | Cremades Schulz et al. ............... 156/212 |

\* cited by examiner

METHOD OF MAKING A VEHICLE HEADLINER ASSEMBLY WITH INTEGRAL SPEAKERS

TECHNICAL FIELD

The present invention relates to a vehicle headliner assembly, and more particularly, to a vehicle headliner assembly incorporating thin speakers sandwiched between the layers of the headliner assembly.

BACKGROUND ART

Vehicle speakers are typically packaged in a vehicle instrument panel, door, or package tray, and are arranged in a manner to provide quality sound to the vehicle occupants. Sometimes high quality sound is difficult to achieve because the speakers must be positioned in remote vehicle locations which require that the sound be bounced off the various vehicle components, such as windows, prior to reaching the vehicle occupants. It is, therefore, desirable to provide a vehicle acoustic system in which the speakers may be placed closely adjacent the vehicle occupants in a configuration which surrounds the vehicle occupants for optimum sound without requiring the sound to bounce off various vehicle interior components prior to reaching the vehicle occupant.

Efforts have been made to package speakers in locations which are closer to the ears of the vehicle occupants, however, such efforts are limited because speakers are generally large and, therefore, difficult to package in desirable locations within the vehicle.

The packaging of speakers in instrument panels, doors, and the package trays within vehicles also adds significant cost to such components because electrical hook-ups must be provided, as well as attachment and trim features and sufficient packaging space for receiving the large speakers. Therefore, it is desirable to package speakers within a vehicle in locations other than the instrument panel, doors, or package tray.

DISCLOSURE OF THE INVENTION

The present invention overcomes the above referenced shortcomings of typical prior art vehicle acoustic systems by providing at least one thin audio speaker (less than approximately 8 millimeters thick) in a position sandwiched between a plurality of material layers within a headliner assembly which is secured to the interior roof of the vehicle. The thin speakers used in the present invention are preferably the "Active Screen Speaker" manufactured by American Power and Light of Plymouth, Calif. Such "Active Screen Speakers" have previously been used as a speaker screen against which projection TV images are projected. With the present invention, these thin speakers are compression molded within the headliner assembly and installed in the vehicle with the headliner assembly.

In this configuration, packaging costs are reduced in the vehicle because the speakers need no longer be packaged in the instrument panel, door or package tray, and the various speakers may be positioned at optimal locations directly adjacent and surrounding the heads of the vehicle occupants.

More specifically, the present invention provides a vehicle headliner assembly for a vehicle having an interior roof. A headliner is attachable to the vehicle interior roof, and includes a plurality of material layers. At least one audio speaker is sandwiched between the material layers. The speaker has a thickness of less than approximately 8 millimeters.

Another aspect of the invention provides an audio system for a vehicle having an interior roof. The audio system includes a multi-layer headliner assembly which is attachable to the vehicle interior roof. At least one audio speaker is sandwiched between layers of the multi-layer headliner assembly. The audio speaker has a thickness of less than approximately 8 millimeters. A subwoofer is secured elsewhere in the vehicle to complete the audio system.

A further aspect of the invention provides a method of manufacturing a vehicle headliner assembly, comprising the steps of:

a) heating a plurality of material layers;

b) positioning at least one audio speaker between the material layers, such speaker having a thickness of less than approximately 8 millimeters; and c) compression molding the material layers together over the audio speaker to form the headliner assembly.

Accordingly, an object of the present invention is to provide an improved vehicle audio system in which thin audio speakers are sandwiched within layers of the headliner assembly.

A further object of the invention is to provide an improved vehicle audio system in which the speakers may be positioned closely adjacent and surrounding the heads of the vehicle occupants, and wherein the speakers are not packaged within the instrument panel, doors, or package tray of the vehicle.

The above objects and other objects, features and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
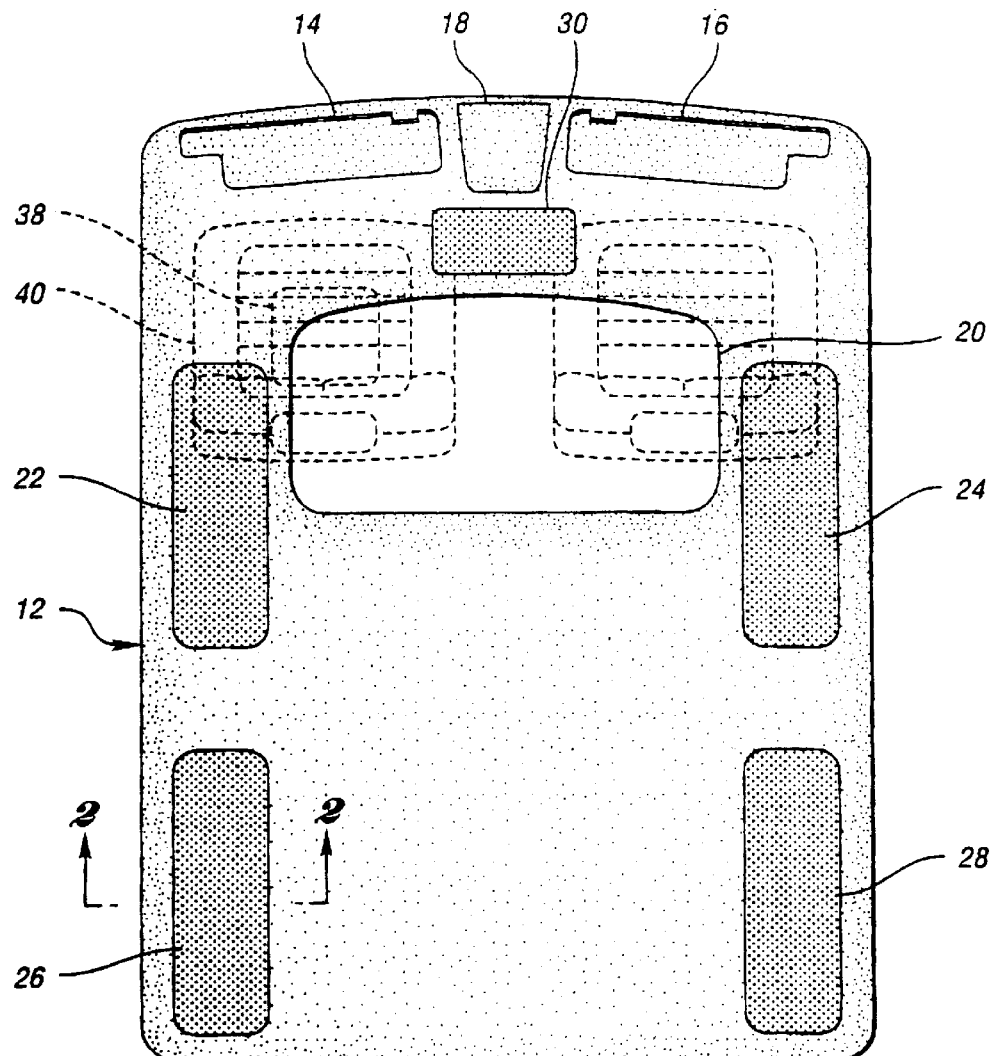
FIG. 1 shows a schematically arranged overhead plan view of a vehicle audio and headliner assembly in accordance with the present invention.
Figure 2:
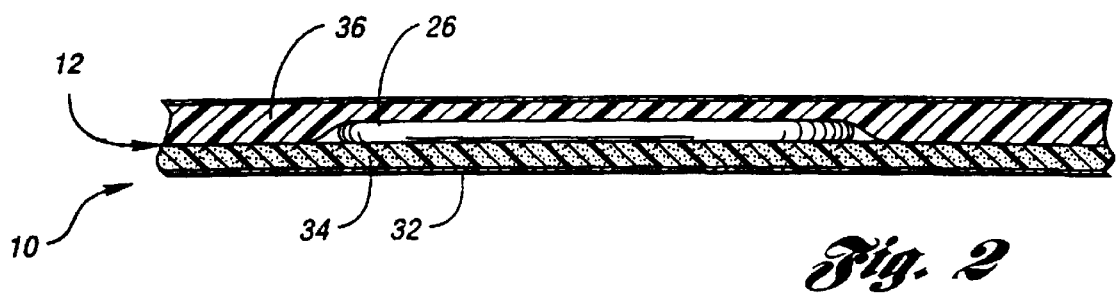
FIG. 2 shows a vertical cross-sectional view taken at line 2—2 of FIG. 1.

Referring to FIGS. 1 and 2, a vehicle headliner assembly and acoustic system 10 is shown in accordance with the present invention. A headliner 12 is configured for attachment to a vehicle interior roof. The headliner 12 is attached to the vehicle interior roof as an assembly, which would typically include sun visors 14,16, an overhead console 18, and a sunroof opening 20.

In accordance with the present invention, the headliner 12 includes a left front speaker 22, right front speaker 24, left rear speaker 26, right rear speaker 28, and center speaker 30 contained therein.

As shown in FIG. 2, the headliner 12 includes multiple material layers. Preferably, the headliner 12 includes a fabric layer 32, a foam layer 34, and a relatively rigid layer 36 which is mounted against the vehicle interior roof. The relatively rigid layer 36 is preferably a TRU (thermal foamable rigid urethane) or PET (polyester) material. The speaker 26 is sandwiched between the foam layer 34 and the relatively rigid layer 36.

The speakers 22, 24, 26, 28, 30 are preferably thin speakers, such as the "Active Screen Speaker" available from American Power & Light of Plymouth, Calif. The thickness of the speaker is approximately 5 millimeters ±1 millimeter. Such speakers have previously been used as a screen against which projection TV images are projected. Because the Active Screen Speaker is comprised of fabrics, plastics, and magnets which are capable of withstanding high temperatures, the active screen speaker may be subjected to sufficiently high temperatures to withstand a compression molding process whereby the speakers are compression molded between the foam layer 34 and the relatively rigid layer 36 of the headliner 12. In this process, the fabric and foam layers 32,34 are preheated, and the relatively rigid layer is preheated, and the speakers are positioned between such layers prior to compression molding of the layers 34,36 together. The speakers may be provided with an integral heat activated adhesive to provide an enhanced bond with the headliner assembly.

The speakers have embedded magnets which vibrate and emit sound which is significant to satisfy approximately 80 percent of the normal sound range. As shown in FIG. 1, a subwoofer 38 may be mounted elsewhere in the vehicle, such as within the front seat 40 to provide bass sound.

The speakers 22, 24, 26, 28, 30 are preferably electrically powered by flat ribbon wiring such as that available from Sheldahl Corporation of Clarkston, Mich. The speakers may be contoured to match the contour of the vehicle interior roof. Such contour may require tuning of the speakers.

Modern headliner designs sometimes include numerous extras, such as sun visors, overhead consoles, handles, lights, etc., therefore, it is desirable to improve structural integrity of the headliner assembly for supporting such components. The present invention provides the added benefit of further strengthening the headliner assembly due to the extra stiffness provided by the speakers 22, 24, 26, 28 and 30, thereby enabling handling of the heavier headliner assemblies.

A further added benefit of the invention is the increased occupant protection because the large speakers provide improved impact energy dissipation by spreading the impact over a larger area for energy absorption within the headliner assembly.

The speaker embodiment shown in FIG. 1 is well suited for accommodating a DVD (digital versatile disk) system or other high quality audio system.

Alternatively, a single integrated flat speaker could be sandwiched in the headliner to provide audio for components in the overhead counsel (i.e., compass, trip, navigation, etc.). This audio source would be in addition to the primary vehicle audio speakers.

While the best mode for carrying out the invention has been described in detail, those familiar with the art to which this invention relates will recognize various alternative designs and embodiments for practicing the invention within the scope of the appended claims.

What is claimed is:

1. A method of manufacturing a vehicle headliner assembly, comprising:
    heating multiple headliner material layers;
    positioning at least one audio speaker between said material layers, said speaker having a thickness of less than approximately 8 millimeters; and
    compression molding said material layers together with said at least one audio speaker therebetween to form the headliner assembly.

2. The method of claim 1, wherein said step of heating multiple headliner material layers comprises heating a foam layer and a relatively rigid layer.

3. The method of claim 2 wherein said relatively rigid layer comprises a thermoformable rigid urethane material.

4. The method of claim 2 wherein said relatively rigid layer comprises a polyester material.

5. The method of claim 2 wherein said step of positioning at least one audio speaker comprises positioning said at least one audio speaker between said foam layer and said relatively rigid layer.

6. The method of claim 1 wherein said at least one audio speaker has a thickness of between 4 millimeters and 6 millimeters.

7. The method of claim 1 wherein said at least one audio speaker comprises a right front speaker, a left front speaker, a front center speaker, a right rear speaker and a left rear speaker.

8. A method of manufacturing a vehicle headliner assembly, the method comprising:
    positioning at least one audio speaker between first and second material layers; and
    compression molding said material layers together with said at least one audio speaker therebetween to form the headliner assembly.

9. The method of claim 8 further comprising heating said material layers prior to said compression molding step.

10. The method of claim 8 wherein said at least one audio speaker includes an integral heat activated adhesive.

11. The method of claim 8 wherein said first layer comprises a foam layer and said second layer comprises a relatively rigid layer.

12. The method of claim 11 wherein said relatively rigid layer comprises a thermoformable rigid urethane material.

13. The method of claim 11 wherein said relatively rigid layer comprises a polyester material.

14. The method of claim 8 wherein said at least one audio speaker has a thickness of less than approximately 8 mm.

15. The method of claim 8 wherein said at least one audio speaker has a thickness of between 4 mm and 6 mm.

16. The method of claim 8 wherein said at least one audio speaker comprises a right front speaker, a left front speaker, a front center speaker, a right rear speaker and a left rear speaker.

* * * * *